(12) United States Patent
Chatterjee et al.

(10) Patent No.: US 8,503,626 B2
(45) Date of Patent: Aug. 6, 2013

(54) SYSTEM AND METHOD FOR PROMOTING CORPORATE INITIATIVES

(75) Inventors: Koushik Chatterjee, Orlando, FL (US); Johnny Hawkins, Kansas City, MO (US); Amanda Livesay, Ridgeway, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1112 days.

(21) Appl. No.: 12/346,246

(22) Filed: Dec. 30, 2008

(65) Prior Publication Data

US 2010/0166163 A1 Jul. 1, 2010

(51) Int. Cl.
  *H04M 11/00* (2006.01)
  *G06Q 30/00* (2006.01)
  *H04W 4/00* (2009.01)

(52) U.S. Cl.
  USPC .......................... 379/93.17; 705/347; 455/466

(58) Field of Classification Search
  USPC ............... 379/93.01, 93.17; 455/466; 705/12, 705/347
  See application file for complete search history.

(56) References Cited

U.S. PATENT DOCUMENTS

| | | | | |
|---|---|---|---|---|
| 5,490,211 | A * | 2/1996 | Adams et al. | 379/265.02 |
| 6,438,216 | B1 * | 8/2002 | Aktas | 379/88.01 |
| 2002/0082997 | A1 * | 6/2002 | Kobata et al. | 705/51 |
| 2003/0032409 | A1 * | 2/2003 | Hutcheson et al. | 455/414 |
| 2003/0072422 | A1 * | 4/2003 | Wengrovitz et al. | 379/93.01 |
| 2003/0147382 | A1 * | 8/2003 | Neuman | 370/352 |
| 2004/0125924 | A1 * | 7/2004 | McMullin et al. | 379/88.19 |
| 2004/0141594 | A1 * | 7/2004 | Brunson et al. | 379/88.12 |
| 2005/0018819 | A1 * | 1/2005 | Schmidt et al. | 379/88.13 |
| 2005/0153718 | A1 * | 7/2005 | Dolph | 455/466 |
| 2005/0256796 | A1 * | 11/2005 | Haga et al. | 705/37 |
| 2007/0156811 | A1 * | 7/2007 | Jain et al. | 709/204 |
| 2007/0206753 | A1 * | 9/2007 | Chang et al. | 379/201.01 |
| 2007/0217594 | A1 * | 9/2007 | Giacometto et al. | 379/219 |
| 2007/0264982 | A1 * | 11/2007 | Nguyen et al. | 455/414.1 |
| 2008/0066098 | A1 * | 3/2008 | Witteman et al. | 725/34 |
| 2008/0123623 | A2 * | 5/2008 | Kurganov | 370/352 |
| 2008/0182555 | A1 * | 7/2008 | Madanes et al. | 455/411 |
| 2008/0317226 | A1 * | 12/2008 | Cruess et al. | 379/93.17 |
| 2009/0074160 | A1 * | 3/2009 | Mitsuo | 379/93.01 |
| 2009/0104923 | A1 * | 4/2009 | Timmons et al. | 455/466 |
| 2009/0129565 | A1 * | 5/2009 | Hyndman et al. | 379/87 |

* cited by examiner

*Primary Examiner* — Christopher M Brandt
(74) *Attorney, Agent, or Firm* — Swanson & Bratschun, L.L.C.

(57) ABSTRACT

A system and method may include storing a set of messages associated with a corporate initiative. A network address of a telephone associated with at least one member of a group of individuals may be identified. A message may be selected from the set of messages for displaying on an electronic display of the telephone. The message may be communicated to the network address for display on the electronic display of the telephone. By displaying the message on the telephone, an employee may be reminded of the message so as to not forget a particular corporate initiative idea.

17 Claims, 8 Drawing Sheets

SUBMISSION FORM

300

Agent ID: [Other ▼] ~302
First: [Reechik] ~304a
Last: [Chatterjee] ~304b
Email: [reechik.chatterjee@embarq.com] ~306
The Idea: [Submit a patent application to protect the intellectual property behind our Embarqovation product.] ~308
Category: [Communications ▼] ~310
Benefit: [It can be adapted into a product for use by external customers.] ~312
Resources: [web hosting, databases, etc] ~314
Comments: [Will help team improve and meet overall service metrics.] ~316
[Submit] ~318

FIG. 3

402  404a  404b    Submit Your Idea           406          400

Click on The Idea for more information.

| # | First Name | Last Name | The Idea |
|---|---|---|---|
| 2 | Zabronda | A | We should wow customers with embargovations from members of the ICARE team. |
| 9 | Belinda | C | For the high end user customer send ... |
| 10 | Ron | D | Servicing the client with excellence requires time and expertise. When .... |
| 11 | Pat | M | Training Desk should be stored on the NVAC .... |
| 12 | Susan | O | We need a flow chart showing the steps ... |
| 15 | Darryl | O | Have a 'Beyond the request notification" ... |
| 16 | Paul | S | Systems for Large businesses... |
| 17 | Jeanne | S | Set up I care groups like ... |
| 18 | Carol | T | All CLLI Code need .... |
| 22 | Bud | A | When completing Sales requests... |

SYSTEM AND METHOD FOR PROMOTING CORPORATE INITIATIVES

BACKGROUND

Corporations and organizations often have initiatives to reduce costs, expand growth, promote new products, or generally raise awareness of certain aspects of its business. Many corporate initiatives are good ideas and succeed as a result of strong leadership for the initiatives. However, many corporate initiatives perform below average or fail as a result of weak leadership, participants being too busy, or team members simply forgetting about certain aspects of the corporate initiatives. Whatever the cause for poor performance or failure of the corporate initiatives, the end result is that an initiative, which, at least at one point, was important enough to fund, did not achieve the results desired by the organization.

SUMMARY

To help overcome the problem of corporate initiatives having poor performance or failing to succeed, the principles of the present invention provide for ideas or messages of a corporate initiative to be displayed to maintain the ideas in the minds of employees to prevent the ideas from being forgotten. In one embodiment, a corporate initiative may be a cost savings program. In displaying the ideas, the ideas may be displayed on telephones of the employees. The telephones may be digital telephones, such as Voice over Internet Protocol (VoIP) telephones, which include electronic displays capable of displaying messages in a dynamic matter (e.g., scrolling or animated messages). By displaying the messages, employees or members of a select group (e.g., corporate initiative committee) may be reminded of different initiative submissions. In one embodiment, the messages are displayed in random order in response to a user placing his or her telephone in an off-hook mode (i.e., when placing or receiving a call). In one embodiment, the messages may be displayed on an electronic display, such as a large, flat screen display or monitor that members of a group, such as a call center, may view from his or her desk, in a lobby, or elsewhere. In another embodiment, the messages may be converted from text to speech and "whispered" over a headset to telephone operators, thereby presenting the messages in an unobtrusive way to the employees.

One embodiment of a system and method may include storing a set of messages associated with a corporate initiative. A network address of a telephone associated with at least one member of a group of individuals may be identified. A message may be selected from the set of messages for displaying on an electronic display of the telephone. The message may be communicated to the network address for display on the electronic display of the telephone. By displaying the message on the telephone, an employee may be reminded of the message so as to not forget a particular corporate initiative idea.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
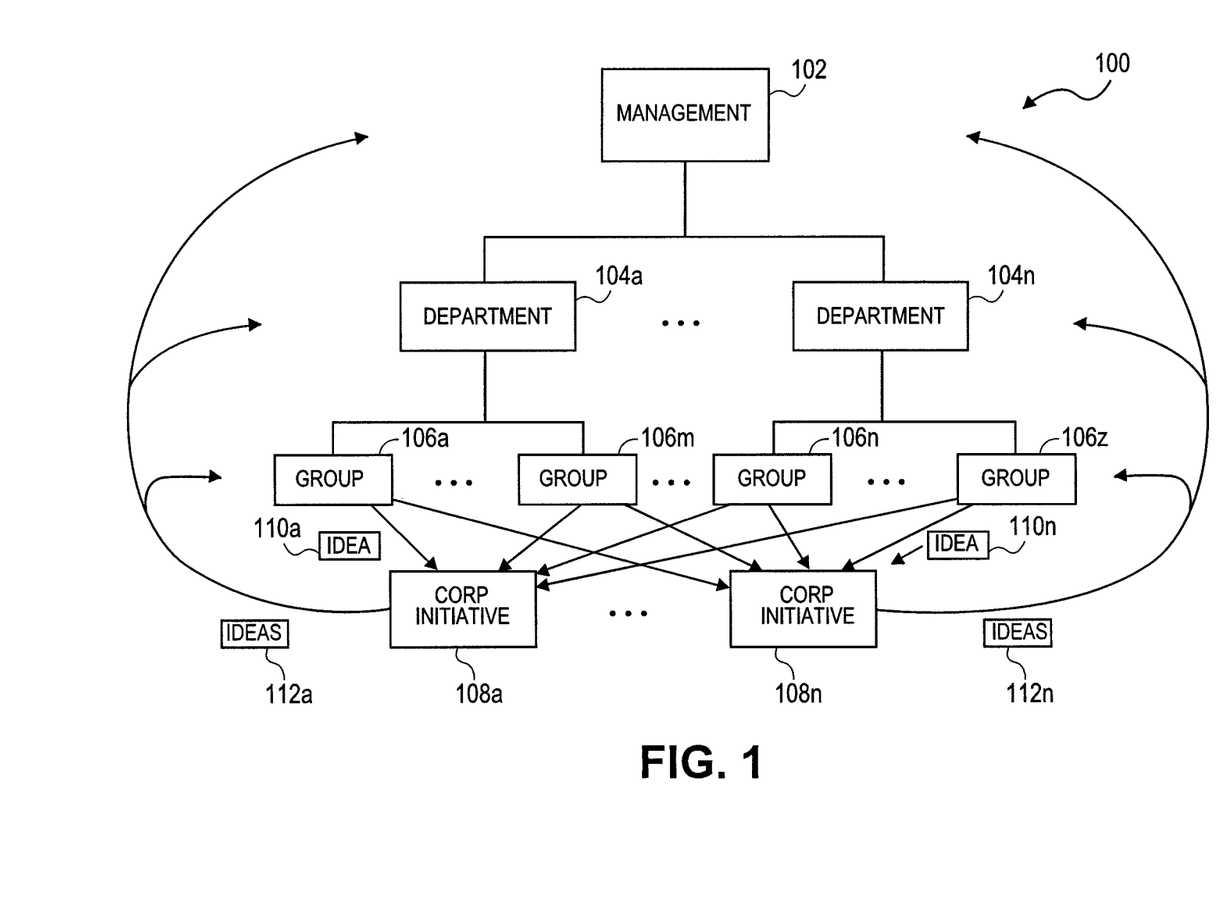
FIG. 1 is a block diagram of an illustrative organizational chart of a business or organization.

With regard to FIG. 1, an illustrative corporate hierarchy chart 100 is shown to include management 102 with departments 104a-104n (collectively 104) positioned thereunder. Within each of the departments 104, groups 106a-106m (collectively 106a) and groups 106n-106z (collectively 106n) operate under departments 104a and 104n, respectively.

As understood in corporate environments, corporate initiatives or business projects are often initiated for particular causes, such as cost savings, marketing efforts, and other corporate purposes. As shown, corporate initiatives 108a-108n (collectively 108) may be established and receive ideas or messages 110a-110n (collectively 110) from individuals within each of the groups 106a and 106n. For the purposes of this description, ideas and messages are used interchangeably. The ideas 110 may be collected by each of the corporate initiatives 108 and, in accordance with the principles of the present invention, be communicated to some or all of the members of the groups 106, departments 104, and management 102. So that the ideas 112 are not forgotten or otherwise displaced for higher priority issues by employees within the company, the ideas 112 may be communicated to the employees selected to receive the ideas on their respective telephones via an electronic display. The ideas 112 may be communicated to employees who are either part of the corporate initiatives 108 or otherwise depending upon the idea and employees to which the ideas relate. The ideas 112 may be communicated in a text format, graphical format, photograph format or video format.

Figure 2A:
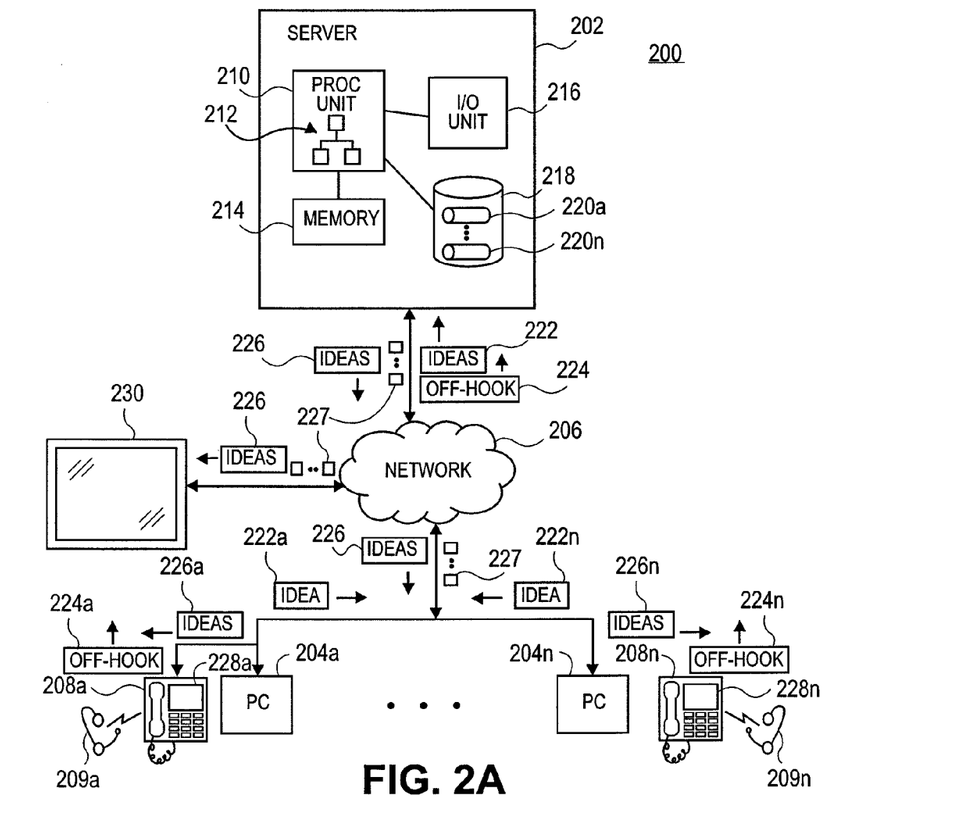
FIG. 2A is an illustration of an illustrative network environment configured to provide for promoting corporate initiatives in accordance with the principles of the present invention.

With regard to FIG. 2, an illustrative network environment 200 that includes a server 202 that communicates with computers 204a-204n (collectively 204) via a network 206 as shown. Employees of a corporation may utilize the computers 204. In addition to the computers 204, the employees or users may utilize telephones 208a-208n (collectively 208). The telephones 208 may be digital telephones that utilize Voice over Internet Protocol (VoIP) or other communications technology. In one embodiment, the employees may utilize headphones 209a-209n (collectively 209) of the telephones 208 for communicating rather than using handsets of the telephones. Customer service representatives may generally utilize the headphones 209, but other employees may similarly use the headsets 209. In one embodiment, the headsets 209 are wired headsets. Alternatively, the headsets 209 may be wireless headsets.

The server 202 may be configured with a processing unit 210 that executes software 212. The software 212 may be utilized to control the processing unit 210 to perform corporate initiative message distribution functionality in accordance with the principles of the present invention. The processing unit 210 may be in communication with a memory 214 that stores data and software, input/output (I/O) unit 216 that communicates data via the network 206, and storage unit 218 that stores data repositories 220a-220n (collectively 220). The data repositories 220 may be configured to store information associated with users and communications equipment of the users. For example, the information of the users may include an identification of departments and groups of each of the users, telephone numbers of each of the users, network addresses of each of the users, and so on. In one embodiment, a network address may be a telephone number. In addition, the data repositories 220 may be configured to store ideas 222a-222n (collectively 222) submitted by users of the computers 204. In one embodiment, the ideas 222 may be submitted via a graphical user interface (e.g., Internet or intranet website) (see FIG. 3).

The software 212 may, in response to receiving off-hook notifications 224a-224n (collectively 224) from the telephones 208, communicate one or more ideas 226, which are selected from the ideas 222 stored in the data repositories 220 in random or non-random order, in data packets 227 to the telephones 208 for display on electronic displays 228a-228n (collectively 228). The off-hook notifications 224 may be communicated with a network address or be identified by the server 202 as being associated with a particular network address. In one embodiment, the message(s) 226 may be communicated and displayed on an electronic display 230, which may be a large-format display, so that employees may view the ideas from their desks or in common areas on a continuous or non-continuous basis. In another embodiment, the ideas 226 may be converted from text-to-speech by the software 212 or another system (not shown) for communication to the telephones 208 so that telephone operators or customer representatives may receive the ideas 226 in data packets 227 that represent audible signals while working without having to watch the electronic displays 228 and 230. In one embodiment, the ideas 226 that are communicated to the telephones 208 in an audio format may be "whispered" to the user of the telephones 208 while the user is not speaking or currently communicating with another user, such as during a ring tone, while on hold, after another party hangs up, and so on. The ideas 226 may be played to a user without a person to whom the user is speaking hearing the ideas 226.

Figure 2B:
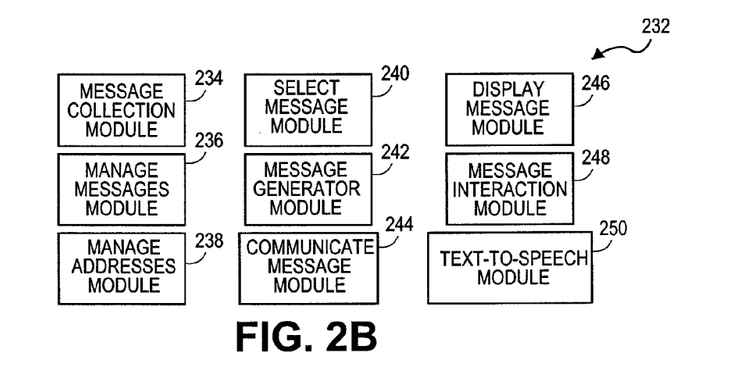
FIG. 2B is a block diagram of illustrative software modules configured to provide for management, communication, and display of messages for users.

With regard to FIG. 2B, illustrative software modules 232 that may be utilized to perform the corporate initiative message distribution functionality in accordance with the principles of the present invention are shown. A message collection module 234 may be configured to collect messages containing ideas for submission for a corporate initiative. The message collection module 234 may be configured to generated and present a graphical user interface, such as a webpage, to users that enables users to submit ideas. The message collection module 234 may further be configured to receive and store the ideas in the data repositories 220 (FIG. 2).

A manage messages module 236 may be configured to manage messages (i.e., ideas) that are submitted by users for the corporate initiatives. The manage messages module 236 may be configured to manage information stored in the data repositories 220, including enabling a manager to revise, add, delete, or otherwise change messages stored in the data repositories. The manage messages module 236 may enable a network manager via a graphical user interface or otherwise to assign ideas to one or more groups for distribution.

A manage addresses module 238 may be configured to store and manage telephone numbers, Internet Protocol (IP) addresses, or any other electronic addresses associated with users. The manage addresses module 238 may further be configured to assign groups to each of the addresses associated with the users so that messages that are communicated to the users may be distributed in a group distribution manner or make a determination as to whether a user of a particular group is to receive a message based on how messages are assigned. For example, the manage messages module 236 may be configured to assign messages to particular groups of users, such as employees within a particular group, department, or associated with a particular corporate initiative. In one embodiment, to establish the groups of users, a network manager may utilize a software tool, such as a graphical user interface, to establish particular groups of individuals beyond those assignments made for typical employee position, group, and department, for example.

A select message module 240 may be configured to select a particular message or idea for distribution to one or more users. The select message module 240 may be configured to randomly select a message for distribution. Alternatively, the select message module 240 may be configured to select a message in a non-random manner, such as in a sequence, for distribution to a user. The select message module 240 may be configured to avoid sending repeat messages to users selected from a group (e.g., particular corporate initiative or department) without sending each of the other messages before repeating, thereby ensuring that a user sees each of the messages or ideas that have been submitted before repeating. In one embodiment, the select message module 240 may be configured to select messages or ideas based on the time of day, day of week, or any other calendar basis. For example, certain corporate initiative ideas may be played in the morning (e.g., new sales and promotional ideas), while other corporate initiative ideas are played in the afternoon (e.g., cost savings and "green" programs). The ideas may be tagged with identifier(s) in the data repositories 220 that are identified by the select message module 240 or the select message module 240 may be configured to select ideas from certain corporate initiatives at certain times.

A message generator module 242 may be configured to access the data repositories 220 and generate a message into a datafile, such as an XML datafile, for communicating to a telephone, computer, or other electronic device of a user. The message generator module 242 may receive an idea as input from the select message module 240. The message generator module 242 may generate data files that are in formats dependent on the destination (e.g., telephone display, large format monitor and computer screen). In one embodiment, the message generator module 242 may be configured to operate in a "pull" environment, where remote electronic devices, such as telephones, request a message to be generated and communicated for display. Alternatively, the message generator module 242 may be configured to operate in a "push" environment, where a server pushes messages to remote electronic devices as each are generated in a central location, such as server 202.

A communicate message module 244 may be configured to communicate a message to an electronic device of a user. In one embodiment, the communicate message module 244 may be configured to receive an off-hook notification or other request signal from an electronic device (e.g., telephone) of a user and, in response, communicate the message in a datafile format or otherwise using a communications protocol, such as data packets, to the electronics device that generated and communicated the off-hook notification signal. The communicate message module 244 may communicate messages utilizing a communications protocol format compatible with a communications network over which the messages are being communicated.

A display message module 246 may be configured to display or cause to be displayed a message on a telephone or other electronics device. In one embodiment, the display message module 246 may operate on the telephone or other electronics device. Alternatively, the server 202 may be configured to drive the display remotely from the electronics device. The display message module 246 may be configured to receive a datafile, such as an XML datafile, and display the datafile for a user to view.

A message interaction module 248 may be configured to receive a response from a user who receives the message. In one embodiment, the message interaction module 248 may be configured to receive a "vote", rating, or other acknowledgement from a user who receives the message or idea and is requested to vote or otherwise respond with an acknowledgement by selecting a key on the telephone. A message may request that the user select a key associated with a graphical or text indicator on the electronic display or a key from the number keypad from "0" to "9." The message interaction module 248 may further be configured to store the vote or rating in association with the message in an individual and/or cumulative manner.

A text-to-speech module 250 may be configured to receive a message for distribution and convert the message from speech into text for distribution via the network 206. The text-to-speech module 250 may be an off-the-shelf text-to-speech software module, as understood in the art. The audible message may be communicated by the communicate message module 244 and be played at a volume lower than typical calls.

Figure 3:
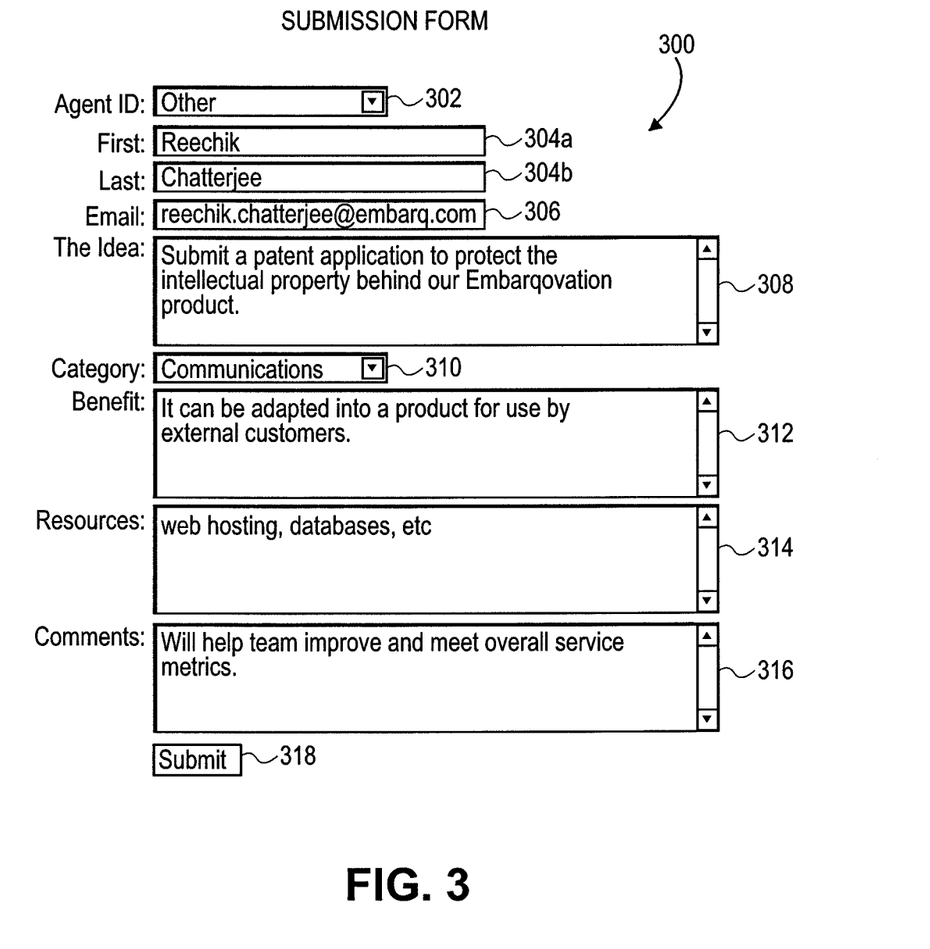
FIG. 3 is a screen shot of an illustrative graphical user interface enabling users to submit ideas for corporate initiatives.

With regard to FIG. 3, an illustrative graphical user interface 300 that enables users to submit ideas to a corporate initiation program is presented. The graphical user interface 300 may include an agent or user ID using a GUI element 302, such as a pull-down menu, first name in a text entry field 304a, last name in a text entry field 304b, and email address in a text entry field 306. The user may enter his or her idea in a text entry field 308 for submission to the corporate initiative and select a category using a pull-down menu 310 that may have pre-established selections (e.g., communications, marketing, advertising, or any other area in which a corporate initiative may be focused). The user may also be requested to enter benefits that may result from the idea in a text entry field 312, resources that may be needed for implementation of the idea in a text entry field 314, and additional comments that reviewers may be presented in a text entry field 316 to assist in deciding whether the idea is worth spending corporate resources in pursuing. Once the user has completed the submission form in the graphical user interface 300, the user may select a "submit" soft-button 318 for submission of the idea to the corporate initiative.

Figure 4A:
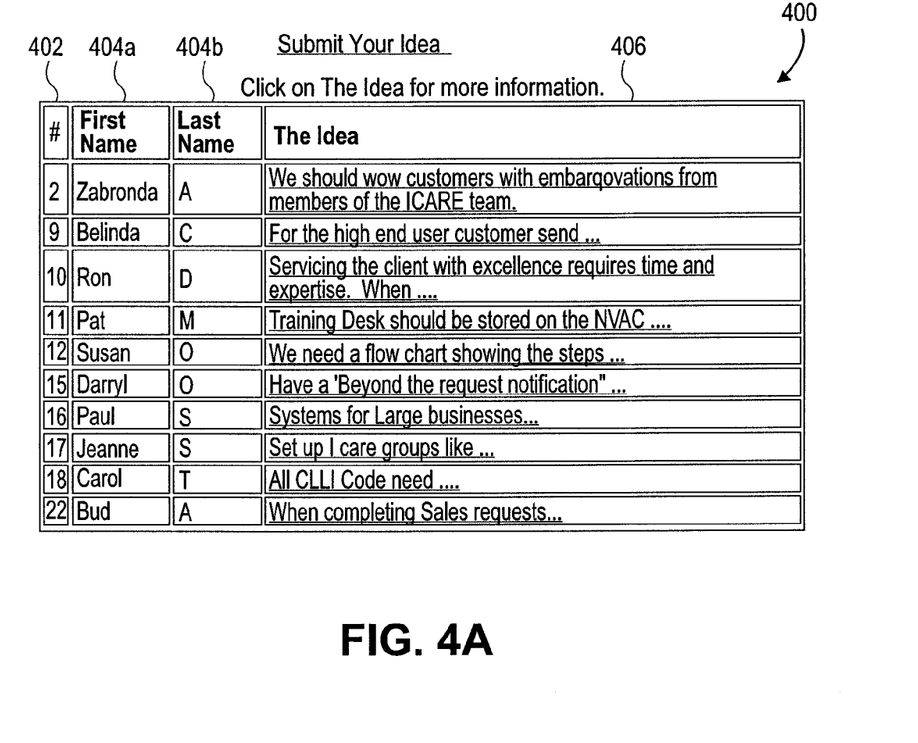
FIGS. 4A and 4B are illustrative tables showing ideas submitted for a corporate initiative.

With regard to FIG. 4A, an illustrative table 400 may be utilized to show a portion of ideas submitted to the corporate initiative. As shown, the table 400 may include a submission number 402, first and last name of the submitter 404a and 404b, respectively, and the idea 406. A user managing the submitted ideas may select the idea by clicking on the idea or message to open and review details of the idea.

Figure 4B:
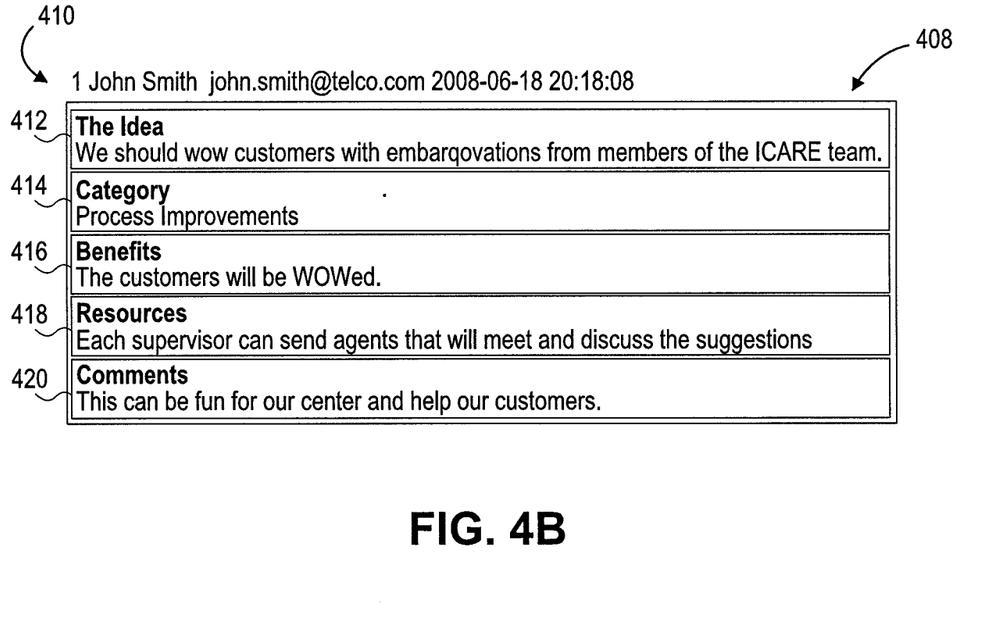

As shown in FIG. 4B, an illustrative table 408 that lists specific information and details of a submitted idea is shown. The table may include a header 410 that includes entry number, name, email address, and submission date, idea data field 412, category data field 414, benefits data field 416, resources data field 418, and comments data field 420. It should be understood that other information may be included in the table 408 depending upon information requested for submission of the idea.

Figure 5:
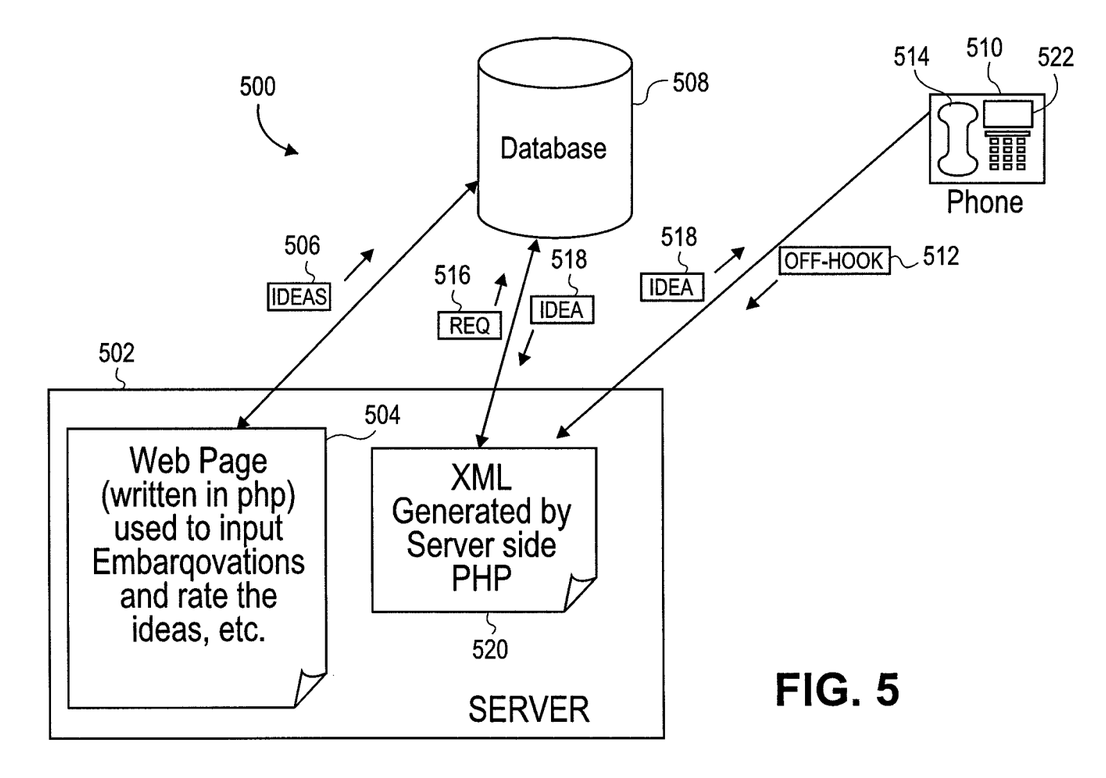
FIG. 5 is an illustration of an illustrative network environment in which a server is configured to collect ideas and generate datafiles that include the ideas for communication to telephones or other electronic devices.

With regard to FIG. 5, an illustrative network environment 500 is shown for management and distribution of ideas to a telephone. A server 502, which may be a web server, may be configured to present a webpage 504 (see, for example, FIG. 3) that may enable users to submit ideas. In one embodiment, the webpage is written in a script language, such as PHP. The webpage 504 may further be configured to enable other users to rate the ideas that have been submitted. The ideas 506 may be communicated from the web server to a database 508. In one embodiment, the database 508 is remotely located from the server 502. Alternatively, the database 508 may be co-located with the server 502. The ideas 506 may be communicated to the database 508 and stored in the database for use in distributing the ideas electronically to other users so as to remind or notify the other users of the ideas stored in the database. One configuration may enable a user to submit his or her idea in text, voice, and/or video. The webpage 504 may enable the user to record an audio or video and the server 502 may store the audio or video in association with text in the database 508 or other database. A text-to-speech system may convert the audio to text for storage.

In one embodiment, a telephone 510 may be configured to communicate an off-hook notification or signal 512 to the server 502 in response to a user of the telephone 510 selectively placing the telephone in an off-hook condition by, for example, taking a handset 514 off of the telephone 510. Alternatively, the telephone 510 may communicate another type of request other than an off-hook message to the web server 502 to indicate that the telephone 510 is available for message(s) to be communicated for display thereat. In one embodiment, a request message may be communicated to the server 502 from the telephone 510 in response to a user pressing a key or button on the telephone 510 to request one or more messages from the server 502. In response to the server 502 receiving an off-hook signal 512 or another request message from the telephone 510, the server 502 may send a request 516 to the database 508 for an idea 518 to be selected. In one embodiment, the idea may be selected randomly. Alternatively, the idea may be selected non-randomly. The idea 518, in response to the request 516, may be communicated from the database 508 to the server 502 for generation of a datafile 520. In one embodiment, the datafile may be an XML datafile. It should be understood that any type of datafile that is capable of being communicated and displayed on the telephone 510 may be utilized in accordance with the principles of the present invention. The datafile 520 may be communicated to the telephone 510 for display on an electronic display 522 at the telephone 510 so that the user may view the idea while he or she is actively using the telephone 510, thereby increasing the likelihood for the user to view the idea.

Figure 6:
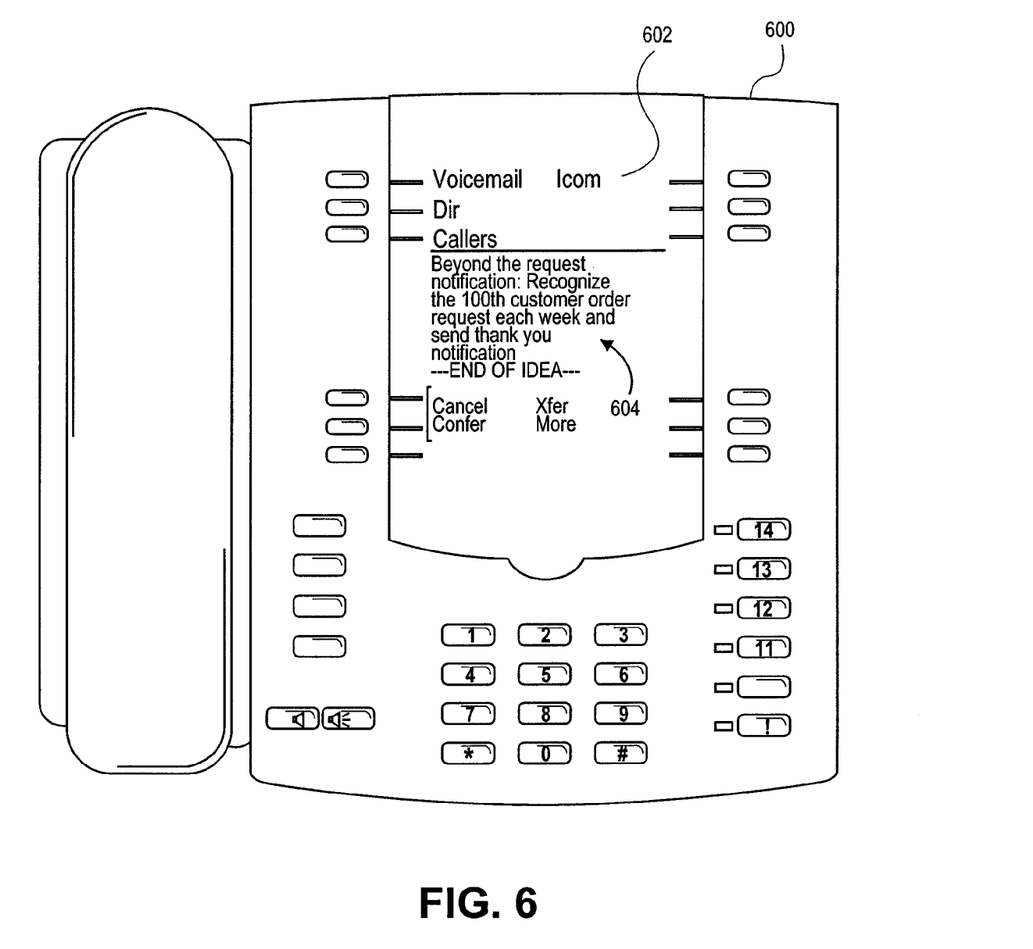
FIG. 6 is an illustration of an illustrative telephone that is displaying an idea on an electronic display of the telephone.

With regard to FIG. 6, an illustrative telephone 600 is shown to include an electronic display 602. The telephone 600 may be a digital phone that is capable of receiving VoIP communications. As the telephone 600 may be a digital telephone, the telephone 600 is further configured to receive data that may additionally be communicated using VoIP technology. In one embodiment, the communications to the telephone 600 may include data messages that are capable of being displayed on the electronic display 602. The messages may include ideas collected by corporate initiatives that are to be communicated to telephones of users that the corporate initiatives determined are to receive the ideas for reminder or other purposes. The messages that are displayed on the electronic display 602 may scroll, include images, such as photographs or graphical images, or videos. The messages may additionally include audio for presentation to the user while not speaking with another party. If the other party called the user, then audio may be muted or disabled so as to avoid interrupting the user viewing the message. In one embodiment, a message or idea may be interactive and a user may provide a response by selecting one or more buttons on the telephone. For example, the user may be requested to select a rating for the idea (e.g., 0-9) by pressing a number key on the telephone 600. Although described as communicating the message to a telephone of a user, the message may also or alternatively be communicated to a large computer screen of the user or large screen in a common area.

Figure 7:
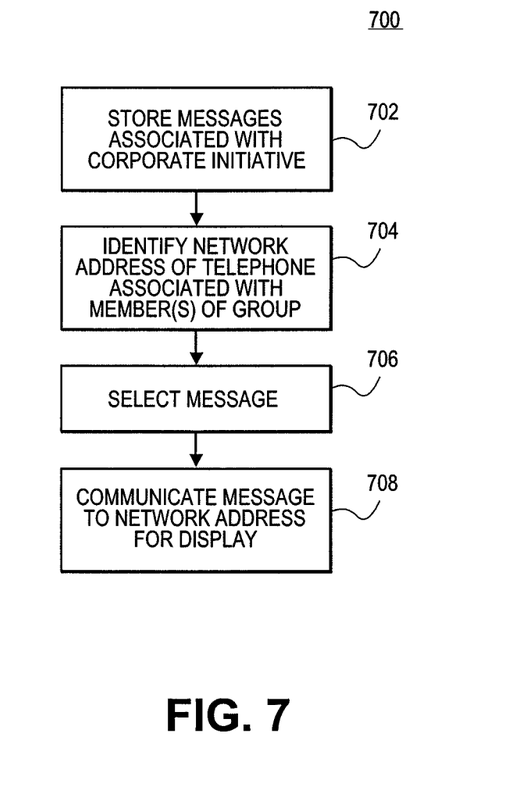
FIG. 7 is a flow diagram of an illustrative process for collecting and communicating ideas to telephones in accordance with the principles of the present invention.

With regard to FIG. 7, a flow chart 700 of an illustrative process for performing the principles of the present invention is shown. The process 700 starts at step 702, where a set of messages associated with a corporate initiative are stored. The corporate initiative may be a cost-savings program, bond drive, energy savings program, or business related program, such as a new project development, for example. At step 704, a network address of a telephone associated with at least one member of a group of individuals may be identified. In one embodiment, the network address may be identified from a data repository or table that maintains network address information associated with employees. A message may be selected from the set of messages for displaying on an electronic display on the telephone at step 706. The message may be selected in a random or non-random manner. At step 708, the message may be communicated to the network address for display on the electronic display of the telephone. In an alternative embodiment, the network address may be an address of a computer or other electronic device associated with an employee. Still yet, the network address may be an address of a large-format electronic display.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for promoting corporate initiatives, said method comprising:
   storing a set of messages associated with a corporate initiative;
   identifying a network address of a telephone associated with at least one member of a group of individuals;
   selecting a message from the set of messages for displaying on an electronic display on the telephone;
   communicating the message to the network address for display on the electronic display of the telephone;
   converting the message from text to synthesized speech;
   communicating the synthesized speech to the telephone for audible communication to a user of the telephone during a period including one or more of during a ring tone, while the telephone is on hold, or after a third party hangs up the connection with the telephone, wherein the audible communication is whispered over the telephone to the user of the telephone during said period;
   receiving a vote or rating in response to the at least one member interactively responding to the message; and
   storing the vote or rating in association with the message.

2. The method according to claim 1, wherein identifying a network address includes identifying a telephone number of at least one member.

3. The method according to claim 1, wherein selecting a message includes selecting a message in a random manner.

4. The method according to claim 1, further comprising:
   receiving an off-hook status notification from a member of the group of individuals; and
   wherein identifying the network address is performed by identifying the network address of the telephone associated with the off-hook status notification.

5. The method according to claim 1, further comprising assigning the message to a group for distribution.

6. The method according to claim 1, wherein selecting a message includes selecting a message based on time-of-day.

7. The method according to claim 1, further comprising generating an XML file including the selected message.

8. The method according to claim 1, further comprising storing a rating for each of the messages.

9. A system for promoting corporate initiatives, said system comprising:
   a storage unit configured to store at least one data repository, said data repository storing a set of messages associated with a corporate initiative;
   an input/output (I/O) unit configured to communicate data over at least one communications network;
   a processing unit in communication with said storage unit and I/O unit, said processing unit configured to:
      identify a network address of a telephone associated with at least one member of a group of individuals;
      select a message from the set of messages for displaying on an electronic display on a telephone to which said I/O unit communicates via at least one communications network;
      communicate the message to the network address for display on the electronic display of the telephone;
      convert the message from text to synthesized speech;
      communicate the synthesized speech to the telephone for audible communication to a user of the telephone during a period including one or more of during a ring tone, while the telephone is on hold, or after a third party hangs up the connection with the telephone, wherein the audible communication is whispered over the telephone to the user of the telephone during said period;
      receive a vote or rating in response to the at least one member interactively responding to the message; and
      store the vote or rating in association with the message.

10. A system according to claim 9, wherein the network address is a telephone number of the at least one member.

11. The system according to claim 9, wherein said processing unit is configured to select a message in a random manner.

12. The system according to claim 9, wherein said processing unit is further configured to:
   receive an off-hook status notification from a member of the group of individuals; and
   wherein identifying the network address is performed by identifying the network address of the telephone associated with the off-hook status notification.

13. The system according to claim 9, wherein said processing unit is further configured to enable a message to be assigned to the group of individuals by selecting members of a committee in a graphical user interface.

14. The system according to claim 9, wherein the message is a text message.

15. The system according to claim 9, wherein the message is selected based on time-of-day.

16. The system according to claim 9, wherein said processing unit is further configured to generate an XML file including the selected message.

17. The system according to claim 9, wherein said processing unit is further configured to store a rating for each of the messages.

* * * * *